(12) United States Patent
Kay et al.

(10) Patent No.: US 11,332,075 B2
(45) Date of Patent: May 17, 2022

(54) RETRACTABLE STAIR SYSTEM

(71) Applicant: TORK LIFT INTERNATIONAL, INC., Kent, WA (US)

(72) Inventors: Jack Kay, Kent, WA (US); Chad A Winslow, Kent, WA (US)

(73) Assignee: TORK LIFT INTERNATIONAL, INC., Kent, WA (US)

(*) Notice: Subject to any disclaimer, the term of this patent is extended or adjusted under 35 U.S.C. 154(b) by 249 days.

(21) Appl. No.: 16/878,404

(22) Filed: May 19, 2020

(65) Prior Publication Data

US 2020/0369211 A1 Nov. 26, 2020

Related U.S. Application Data

(60) Provisional application No. 62/850,531, filed on May 20, 2019, provisional application No. 62/910,628, filed on Oct. 4, 2019.

(51) Int. Cl.
*B60R 3/02* (2006.01)
*B60R 3/00* (2006.01)

(52) U.S. Cl.
CPC .............. *B60R 3/02* (2013.01); *B60R 3/007* (2013.01)

(58) Field of Classification Search
CPC .................................. B60R 3/02; B60R 3/007
See application file for complete search history.

(56) References Cited

U.S. PATENT DOCUMENTS

| 1,128,212 | A | * | 2/1915 | Woolard | ................ B60R 3/02 |
| | | | | | 182/95 |
| 2,050,593 | A | | 8/1936 | Traut | |
| 2,487,921 | A | | 11/1949 | Culver | |
| 3,180,451 | A | | 4/1965 | Patterson | |
| 3,394,947 | A | | 7/1968 | Strube, Sr. | |
| 3,462,170 | A | | 8/1969 | Smith | |
| 3,610,658 | A | | 10/1971 | Sartori | |
| 3,756,622 | A | | 9/1973 | Pyle et al. | |
| 3,807,757 | A | | 4/1974 | Carpenter | |
| 3,858,905 | A | | 1/1975 | Peebles | |
| 4,623,160 | A | | 11/1986 | Trudell | |
| 4,720,116 | A | | 1/1988 | Williams | |
| 5,005,850 | A | | 4/1991 | Baughman | |

(Continued)

*Primary Examiner* — Bryan A Evans
(74) *Attorney, Agent, or Firm* — R. Reams Goodloe, Jr.

(57) ABSTRACT

A retractable stair assembly for vehicles. In an embodiment, the retractable stair assembly may be detachable. Mounting brackets may be provided at opposing sides of a floor plate, and a one-piece mounting bracket assembly provided for installation at the threshold of a door in a recreational vehicle. Pivot plates are provided for pivotal movement of a retractable stair assembly about pivot studs provided on the mounting brackets. Pivot plates may be in the form of open jaw brackets provided at each side of a sill cover plate, to enable removal of the retractable stair assembly. A sill cover plate is provided that is shaped and sized to fit over the threshold and sill in a recreational vehicle doorway, yet allow closure of the door. In an embodiment a bottom stair is independently deployable, so the stair may be used, or not used, as may be appropriate at a given location. The independently deployable stairs are secured by an uplock and downlock operable with a latch which is biased in a closed condition at either the uplock or downlock position.

36 Claims, 11 Drawing Sheets

(56) References Cited

U.S. PATENT DOCUMENTS

| | | | |
|---|---|---|---|
| 5,039,119 | A | 8/1991 | Baughman |
| 5,311,965 | A | 5/1994 | Wu |
| 5,505,476 | A | 4/1996 | Maccabee |
| 5,547,040 | A | 8/1996 | Hanser |
| 5,941,342 | A | 8/1999 | Lee |
| 5,957,237 | A | 9/1999 | Tigner |
| 6,082,751 | A | 7/2000 | Hanes |
| 6,213,486 | B1 | 4/2001 | Kunz |
| 6,435,616 | B1 | 8/2002 | Travis et al. |
| 6,659,224 | B2 | 12/2003 | Medsker |
| 7,677,584 | B2 * | 3/2010 | Raley .................. E06C 1/387 182/127 |
| 8,246,063 | B1 * | 8/2012 | Rowland ............... B60R 3/02 280/166 |
| 8,251,178 | B2 * | 8/2012 | Krobot .................. B60R 3/02 182/127 |
| 8,678,411 | B2 | 3/2014 | Kibler |
| 9,010,473 | B1 * | 4/2015 | Rasmussen ............ B60R 3/02 180/166 |
| 9,527,448 | B1 | 12/2016 | Kay et al. |
| 10,377,313 | B1 * | 8/2019 | Brunner ................. B60R 3/02 |
| 10,604,078 | B2 * | 3/2020 | Hedley .................. E06C 7/182 |
| 2008/0157500 | A1 | 7/2008 | Raley |
| 2009/0189365 | A1 | 7/2009 | Ferguson |
| 2011/0140389 | A1 | 6/2011 | Ellement |
| 2013/0193667 | A1 | 8/2013 | Ellement |
| 2015/0097353 | A1 | 4/2015 | Rasmussen |

* cited by examiner

RETRACTABLE STAIR SYSTEM

RELATED PATENT APPLICATIONS

This application claims the benefit of priority from U.S. Provisional Patent Application Ser. No. 62/850,531, filed May 20, 2019, entitled RETRACTABLE STAIR SYSTEM, the contents of which are incorporated herein in its entirety, including the specification, drawing, and claims, by this reference. This application claims the benefit of priority from U.S. Provisional Patent Application Ser. No. 62/910,628 filed Oct. 4, 2019, entitled QUICK DISCONNECT FOR DETACHABLE STAIR SYSTEM, the contents of which are incorporated herein in its entirety, including the specification, drawing, and claims, by this reference. This application cross-references and incorporates by reference U.S. patent application Ser. No. 16/878,435, filed of even date, entitled QUICK DISCONNECT FOR DETACHABLE STAIR SYSTEM, the contents of which are incorporated herein in its entirety, by this reference.

STATEMENT OF GOVERNMENT INTEREST

Not Applicable.

COPYRIGHT RIGHTS IN THE DRAWING

A portion of the disclosure of this patent document contains material that is subject to copyright protection. The patent owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to retractable stairs, and in particular, to stairs configured for use with driven or towed vehicles, and especially, motor homes and recreational vehicles, including campers on pickup trucks, or on towed campers, or the like.

BACKGROUND

A continuing need exists for improvements in stair systems for use entering and leaving a variety of driven or towed vehicles. Often, vehicles of various types park at locations where an entrance door or platform is at a level above the ground where ease and/or safety of access to the vehicle may be facilitated by the availability of a stair system. Further, quite often a vehicle is parked over sloping or uneven ground, so placement of legs on the ground, for support or stability, is often problematic in prior art designs of which we am aware. A wide variety of stair structures have been known and utilized as appropriate for various applications. And, although many of such prior art stair structures have been constructed which in some limited fashion enable a user to effect or provide some adjustment in the stairs, at least in the case of campers used on pickup trucks, adjustment is generally only with respect to extension from the camper. Thus, often a separate stool, block of wood, or other structure is necessary for placement on the ground in order to provide reasonable height for users to access existing stairs to a camper.

A common problem encountered in prior art stair systems is that when operating on uneven ground, such structures are often not adjustable in a manner to provide a secure final level platform near the ground. Many prior art stair structures inevitably leave a gap of a few inches between a desirable stair platform height and an actual stair platform height achieved. Also, it is often difficult to quickly adjustment various prior art stair designs. Often, the result is a vehicle located a particular site, such as a campsite or jobsite with an entrance/exit stairs/platform which does not provide adequate safety in terms of providing an even distance between stairs, vertically, or with respect to providing stable contact with the ground below.

A previous retractable stair system design which is also owned by Torklift International, Inc. provided some of the advantages of the present system, and such details were disclosed in prior U.S. Pat. No. 9,527,448 B1, issued to Jack KAY and Joel CRAWFORD, on Dec. 27, 2016, entitled RETRACTABLE STAIR SYSTEM WITH PRECISION ELEVATION CONTROL, the disclosure of which is incorporated herein in its entirety, including the specification, drawing, and claims, by this reference. Nevertheless, there remains a continuing and unmet need for a retractable stair system which may be safely stowed inside the vehicle or camper on or in which the retractable stair system is mounted, so that the retractable stairs are easily deployed, and are easily stowed when no longer in use.

SOME OBJECTS, ADVANTAGES, AND NOVEL FEATURES

An objective of our invention is to provide a design for a retractable stair system in which a varying number of steps may be provided.

Another objective of our invention is to provide a design for a retractable stair system in which the support pad distance below the bottom step is individually adjustable at either side of the step.

Another important objective is to provide a retractable stair system which is easily and rapidly adjustable in total stair height, yet retains the ability to evenly space the stair steps which are provided.

Another important objective is to provide a retractable stair system in which a lower stair is independently adjustable and deployable.

A related and important objective is to provide a retractable stair system in which the stairs are sturdy and of high strength.

A related and important objective is to provide a retractable stair system in which the length of support to ground contact pads is quickly adjustable, individually, on each side of the retractable stair system.

Another important objective is to provide a compact retractable stair system structure and frame design in which the stairs may be easily installed in existing or new vehicles, and in which the retractable stairs are neatly and securely stowed inside the vehicle when not in use, for example when the vehicle is in service over the road.

Another important objective is to provide a compact detachable stair system structure in which the stairs may be easily extended or retracted in vehicles, and in which a detachable stair portion may be easily removed when the stairs are not in use.

Finally, another important objective is to provide a high strength retractable stair system which can be conveniently and easily built with conventional manufacturing processes, so that manufacturing costs are minimized.

SUMMARY

We have now invented a retractable stair system for vehicles which provides for easy stowage of stairs when not in use, and which provides convenient, adjustment of the overall height of the stairs, and which provides for equal spacing between stair steps when the stair system is deployed. This is important since it enhances ease of use of the stairs (i.e. minimizes deployment and stowage time requirements), and thus increases the safety of access to and from a vehicle (e.g., a camper mounted on the back of a pickup truck). Further, individually adjustable foot pads enable secure support of the stairs, even when the stair system is deployed on uneven ground. Various embodiments provide designs with either a securely hinged or detachable pivot configuration, so that the retractable stair system can be easily and quickly placed in a compact configuration, and then either (a) turned up and stowed inside the vehicle in which it is mounted, or (b) when using a detachable pivot configuration, be removed from the vehicle. Thus, when an embodiment utilizing a detachable pivot configuration is employed, a detachable stair portion of the retractable stair system can be easily and quickly removed for storage.

In various embodiments, a retractable stair system as disclosed herein may include a number of components. Such components may include (a) mounting brackets for pivotally deploying the retractable stair system, which mounting brackets may be provided as a mounting bracket pair mounted on a footplate, as an integral, one-piece member, (b) a sill plate that is sized and shaped to allow a door of the vehicle to close above the stairs, when deployed, (c) an extensible-retractable scissors stair assembly, (d) a manually adjustable latching system for locking the extensible-retractable scissors stair assembly in a particular position, (e) an independently deployable lower stair member, and (f) individually adjustable foot pads for support of the retractable stair system above both an even substrate or over uneven ground.

In an embodiment of the adjustable foot pads, a detent system may be utilized, where a spring loaded pin is adjustably locatable to any one of a plurality of latch hole locations along an extensible support tube, so that when a detent is pressed inward, an adjustment may be made, and when the detent protrudes through a specific latch hole, the height of the foot pad is secured at such location. In this manner, foot pads at either side of the stairs may be individually adjusted to different heights when the retractable stair system is located above uneven ground.

Moreover, the retractable stair system with independently deployable lower stair needs no extra parts, bolts, or other components for on-site assembly and deployment. Resultantly, a pivotally deployable, retractable stair system as disclosed herein is easy to use, since all necessary components are already on board and readily available. And, in an embodiment, a detachable stair portion may be easily removed from a doorway, for out-of-the-way storage.

BRIEF DESCRIPTION OF THE DRAWING

The present invention(s) will be described by way of exemplary embodiments, using for illustration the accompanying drawing in which like reference numerals denote like elements in the various figures, and in which.

Figure 1:
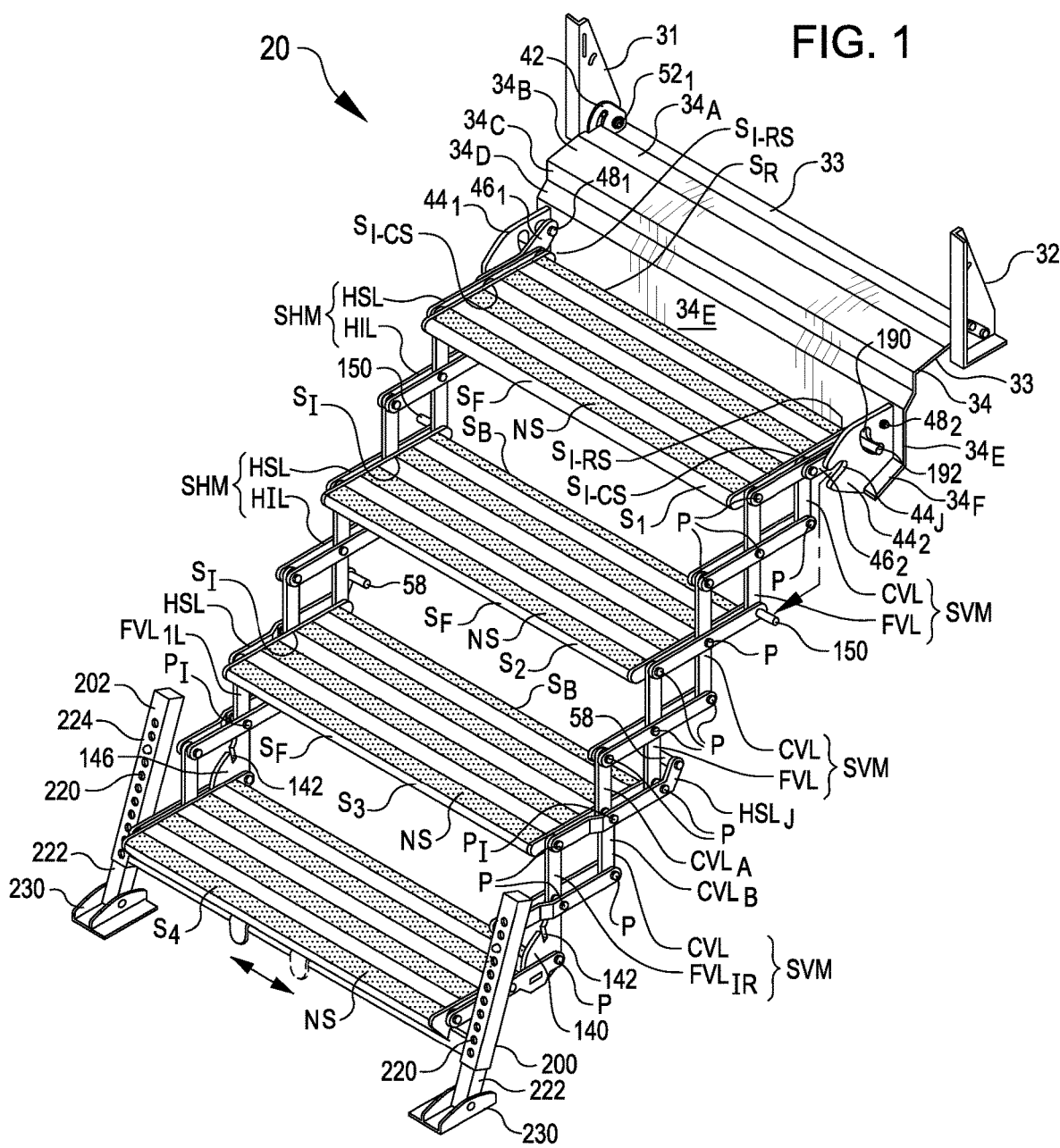
FIG. 1 is a perspective view of an embodiment for a retractable stair system, showing mounting brackets for support of the retractable stair system as if in a doorway (not shown), with a right end open jaw bracket and a left end open jaw bracket affixed to opposing ends of a sill cover plate, and with the left end open jaw bracket and the right end open jaw bracket pivotally attached to the mounting brackets, and with a retractable stair assembly fully extended in a working position, supported by adjustable mounting feet.

The foregoing figures, being merely exemplary, contain various elements that may be present or omitted from a final configuration for an embodiment of a retractable stair system that is pivotably mounted at a sill plate in the threshold of a door of a recreational vehicle, or that may be implemented in various embodiments described herein for a retractable stair system for a vehicle. Other variations in retractable stair systems for a vehicle may use other mechanical structures, mechanical arrangements, or size and shape of components, and yet employ the principles described herein and as generally depicted in the drawing figures provided, and as more specifically called out in the claims set forth below. In particular, although various dimensions may be utilized by those of skill in the art to make and use the claimed invention, and there is no intention to limit the claimed invention to dimensional data, any of which is exemplary rather than mandatory. Thus, a retractable stair system may be provided which is sized up or down from any dimensions provided, without affecting the scope of the appended claims. An attempt has been made to draw the figures in a way that illustrates at least those elements that are significant for an understanding of an exemplary retractable stair system with pivot connections for attachment, one of which may be selected for use in various types of vehicles.

It should be understood that various features may be utilized in accord with the teachings hereof, as may be useful in different embodiments as useful for various sizes and shapes of retractable stair systems for vehicles, depending upon the specific requirements (such as typical height of the bottom of a vehicle door above the road) within the scope and coverage of the teachings herein as defined by the claims. Further, like features in various embodiments for retractable stair systems may be described using like reference numerals, or other like references, without further mention thereof.

DETAILED DESCRIPTION

Attention is directed to FIG. 1 where a perspective view of a retractable stair system 20 suitable for mounting at the threshold 22 at the door 24 (see FIG. 2) of a recreational vehicle (not shown). Comparing FIG. 1 to FIG. 10, each figure illustrates an embodiment of a retractable stair system 20 having four stair steps ($S_1$, $S_2$, $S_3$, and $S_4$, respectively), although in FIG. 10 the lowermost step $S_4$ is shown in a secured, stowed position, which is made possible since the lowermost step $S_4$ is independently deployable, and does not extend or retract in concert with the other stairs, $S_1$, $S_2$, and $S_3$, as illustrated. A retractable stairs system may, in various embodiments, be provided with a number N of stairs S, in a series of stairs $S_1$ to $S_N$, wherein N is a positive integer. Although in various embodiments illustrated, the number N of stairs S shown is four, a number N of stairs provided may easily range from 2 to 6, inclusive, using the principles described herein. An Nth stair in a series (in FIG. 1, $S_N$ is $S_4$, the $4^{th}$ stair from the top) may be independently deployable, as may be better appreciated from FIGS. 5, 7, and FIG. 10. As described herein, in an embodiment, the Nth stair is the bottom stair, counting from the top. Alternate nomenclature could utilize the lowermost stair as $S_1$, and in such case the $1^{st}$ stair, rather than the Nth stair, would be independently deployable, and thus the description and claims herein are directed to the use of a bottom stair which is independently reversible, regardless of the nomenclature adopted for description.

Figure 4:
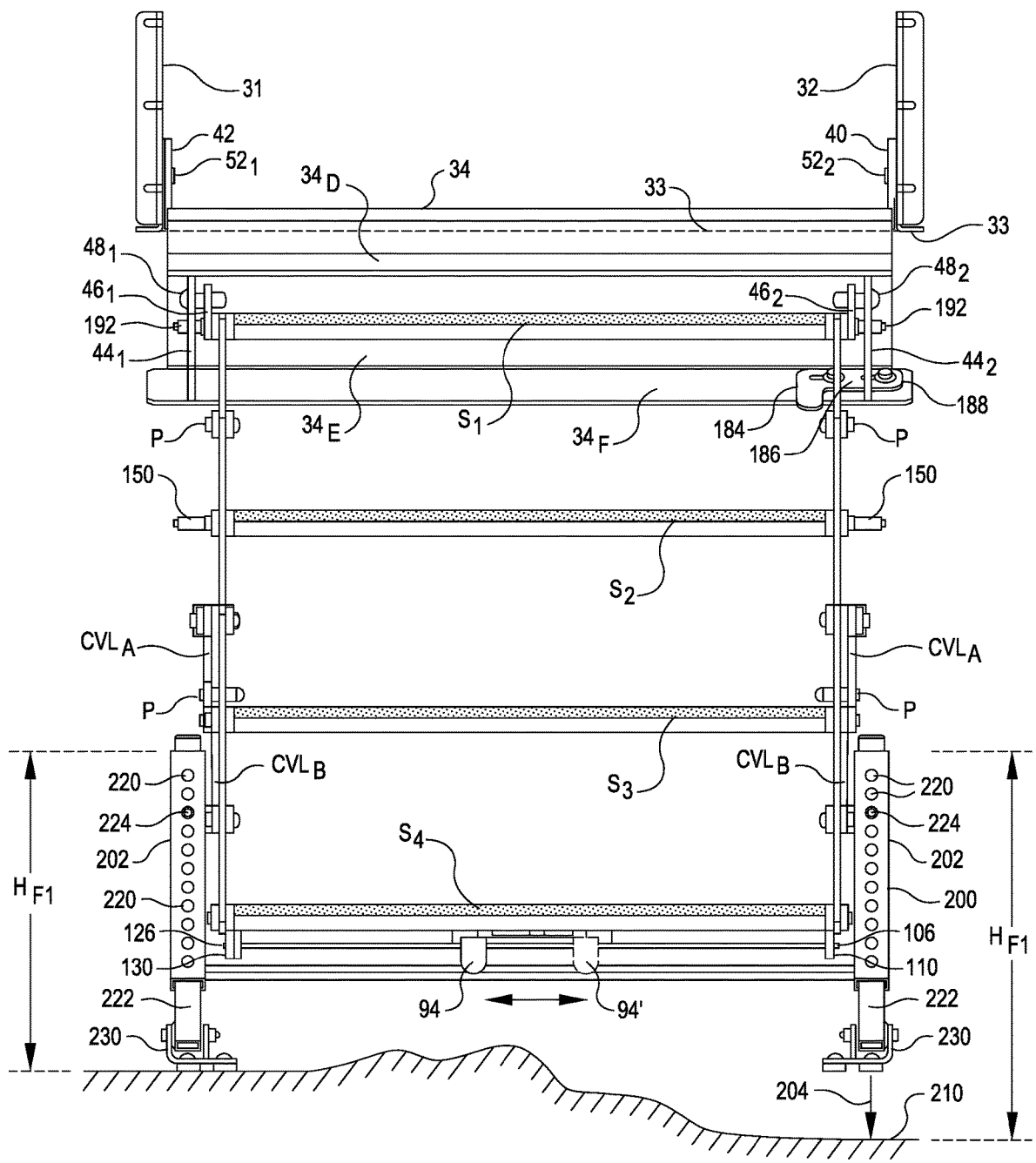
FIG. 4 is a front elevation view of the retractable stair system as just provided in FIG. 1 above, showing the left and right mounting brackets, a floor plate extending between the left mounting bracket and the right mounting bracket, the use of a sill cover plate, and attached retracting mechanism components, a latch tab, and the steps themselves, including an independently adjustable lower stair and independently vertically adjustable mounting feet useful for placement on varying terrain to achieve secure placement of the retractable stair system.
Figure 10:
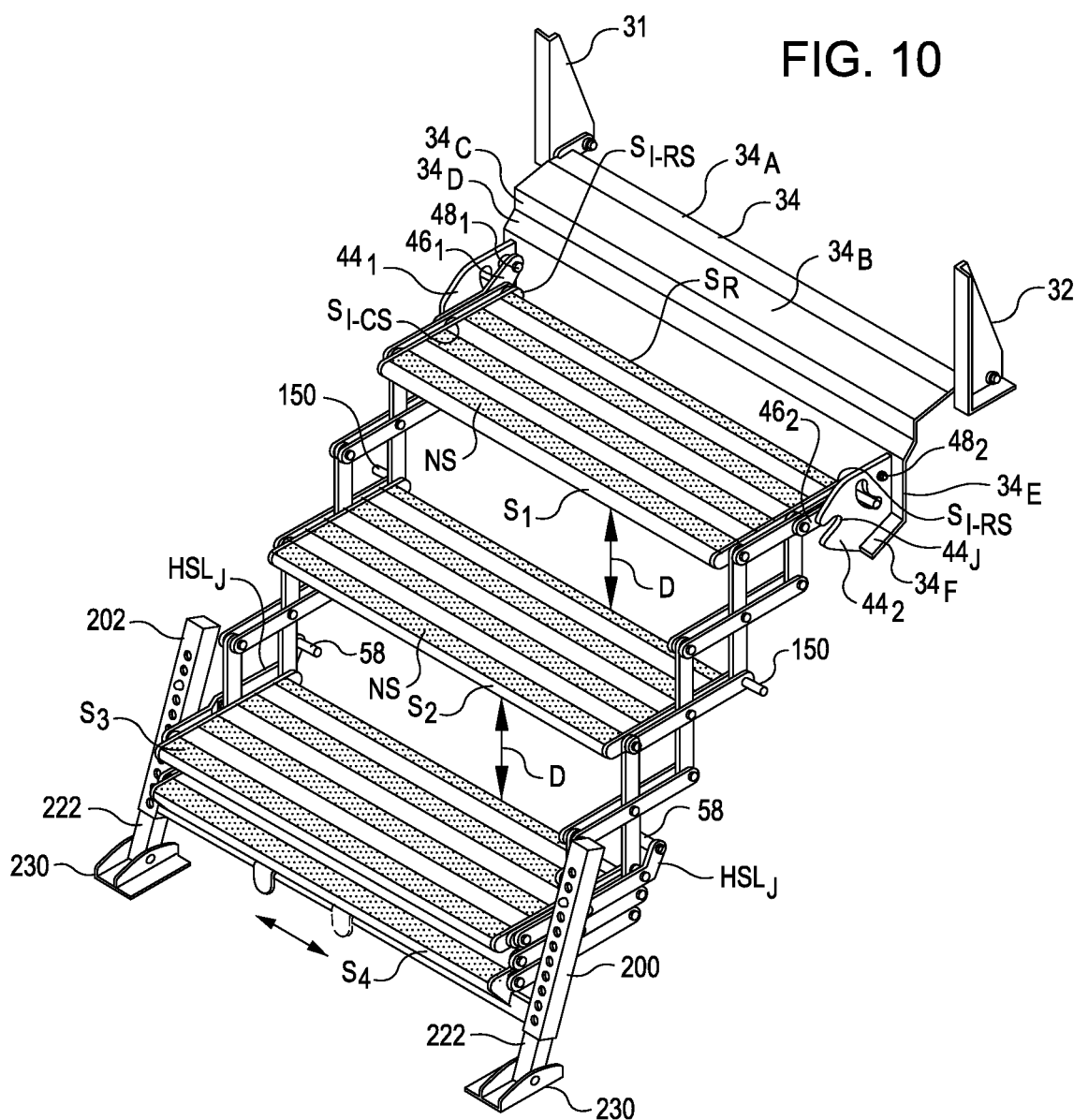
FIG. 10 is a perspective view of a retractable stair system where fixed pivot brackets (rather than right end and left end open jaw removable pivot brackets) have been used to secure the retractable stair system in place for pivoting motion outward and downward, and with the retractable stairs shown in a deployed position, but with the lower independently deployable stair in the stowed, unused position.

As seen in FIG. 1 and similar figures of the drawing, generally, mounting brackets 31 and 32 may be provided to secure the retractable stair system 20 to a recreational vehicle. In an embodiment, as seen in FIG. 4, a pair of mounting brackets 31 and 32 may be mounted to, and spaced apart by, a floor plate 33, to provide a one-piece mounting structure for mounting the retractable stair assembly in the door frame of a recreational vehicle. In an embodiment, the left side mounting bracket 31 may include a foot $31_F$ configured to stand on and be supported by, and affixed to the floor plate 33. In an embodiment, the right side mounting bracket 32 may include a foot $32_F$ configured to stand on and be supported by, and affixed to the floor plate 33. Or, as shown in FIG. 10, in an embodiment the pair of mounting brackets 31 and 32 may be independently provided, without the use of a floor plate 33. In an embodiment, as can be appreciated from FIG. 8 and as better seen in FIG. 1, the overall width of floor plate 33 may be sized as the overall width $D_0$ available for mounting the detachable stair system 20 in a recreational vehicle. For standard recreational vehicle doorway widths, it has been found convenient to provide floor plates 33 having an overall width $D_0$ of about twenty three and seven sixteenths of an inch (23-7/16") for narrow doors, and about twenty seven and seven sixteenths of an inch (27-7/16") for wider doors. Importantly, the use of a floor plate 33 simplifies installation, and thus reduces installation time, and may also avoid or at least minimize the use of intrusive fasteners otherwise necessary in order to securely place the detachable stair system 20 in the doorway of a recreational vehicle.

In various embodiments, the mounting brackets including left mounting bracket 31 and right mounting bracket 32 securely and pivotally locate therebetween a sill cover plate 34, with help of an intervening pair of pivot brackets, one attached to the right side and one attached to the left side (when viewed from a street or the outside of a recreational vehicle) of the sill cover plate 34. The left and right pivot studs $52_1$ and $52_2$ are mounted to the left mounting bracket 31 and right mounting bracket 32, respectively. In an embodiment the left and right pivot studs $52_1$ and $52_2$ may be provided as threaded bolts and thus may be secured to left 31 and right 32 mounting brackets via use of nuts as indicated by fasteners $53_1$ and $53_2$, as seen for example in FIG. 8 with respect to fastener $53_1$. Or, in other embodiments, fixed pivot brackets 35 (rather than detachable open jaw pivot brackets 40 and 42) may be provided at either side of sill cover plate 34, as indicated in FIG. 10, and consistent with the details of bracket 31 shown in FIG. 11.

In an embodiment, the pair of pivot brackets are provided in the form of a right end open jaw bracket 40 and a left end open jaw bracket 42. The right end open jaw bracket 40 is affixed to a right end 36 of the sill cover plate 34, and the left end open jaw bracket 42 is affixed to a left end 38 of the sill cover plate 34. The right end open jaw bracket 40 and the left end open jaw bracket 42 are configured for easy installation to and removal from a left pivot stud $52_1$ and a right pivot stud $52_2$, so that a detachable stair portion 21, as seen in a folded up and stowed position in FIG. 8, can be disengaged from the left pivot stud $52_1$ and the right pivot stud $52_2$ by hand by a single adult, without the use of tools or machinery. In an embodiment, the right end open jaw bracket 40 and the left end open jaw bracket 42 each comprise fixed plates, and have a pivot end in which a generally U-shaped pivot stud receiver 47 is defined by an interior sidewall 49 having a proximal end 50 sized and shaped for interfitting pivotal engagement with the left pivot stud $52_1$ or the right pivot stud $52_2$ In an embodiment, the right end open jaw bracket 40 and the left end open jaw bracket 42 may each further include an arcuate shaped guide slot 60, which is spaced radially outwardly from the center of rotation of right end and left end open jaw brackets 40 and 42 about pivot studs $52_1$ and $52_2$ respectively. The guide slot 60 may include a proximal end 62 and a curved opening extending away from the proximal end 62. The arcuate shaped guide slot 60 may thus be defined between an interior guide slot edge 64 and an extending finger 66 reaching out to a distal end 68.

Figure 8:
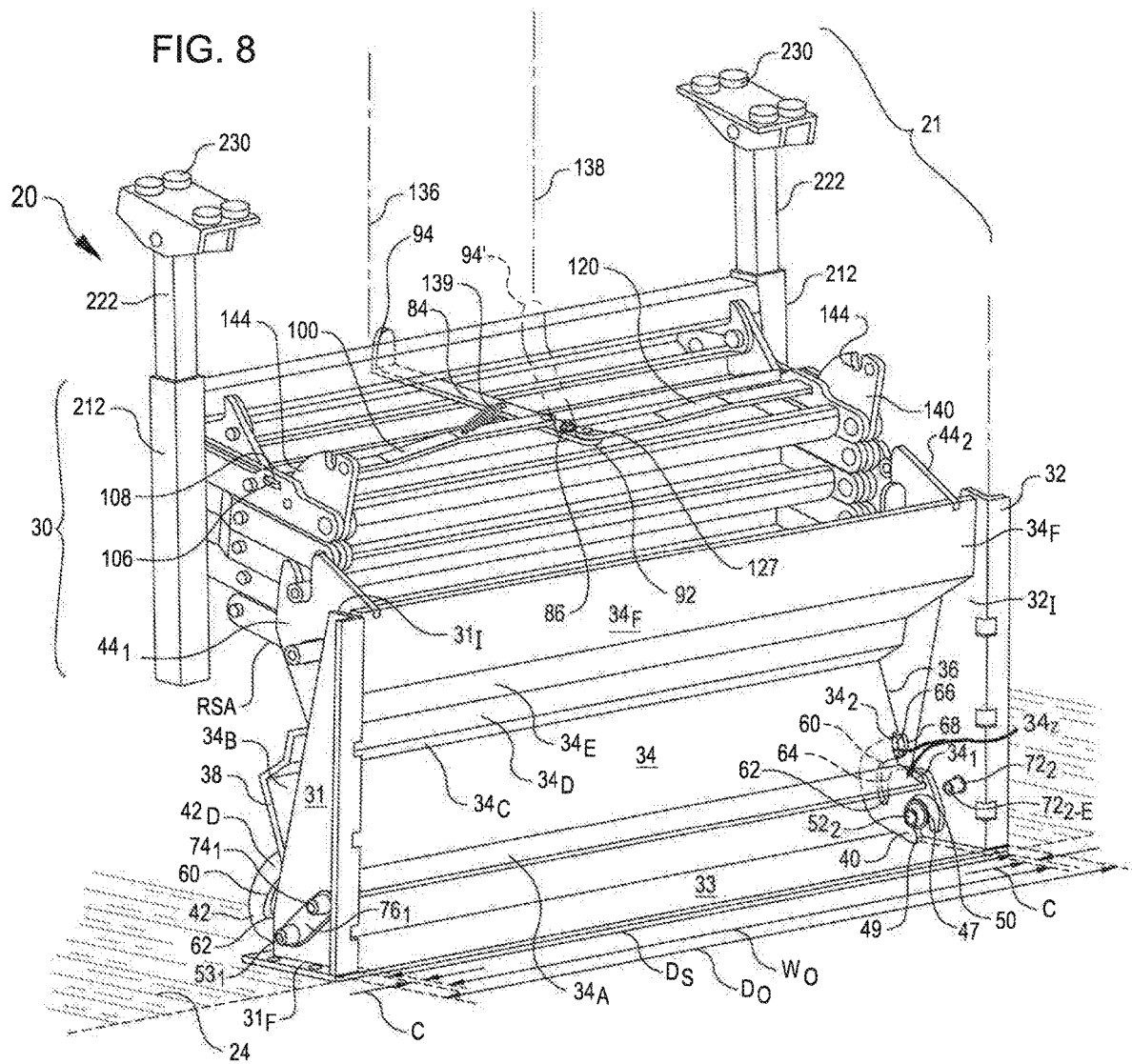
FIG. 8 is a perspective view of an embodiment for a retractable stair system similar to that just depicted in FIG. 1, illustrating an embodiment in which a detachable stair portion is provided, using open jaw pivot brackets, as well as a sill cover plate affixed to the open jaw pivot brackets for rotation or detachment therewith, with fully retracted detachable stair portion shown in the upright, locked position, as well as mounting brackets with pivot studs and locking studs thereon, and use of a floor plate to space apart the mounting brackets for easy installation.

As can be appreciated from FIG. 8, in an embodiment, a quick disconnect mechanism may be provided wherein the left side mounting bracket 31 and the right side mounting bracket 32 additionally include left and right locking studs, $72_1$ and $72_2$, respectively. The locking studs $72_1$ and $72_2$ are sized and shaped for secure interfitting sliding motion within and engagement with the arcuate shaped guide slots 60 in the right end open jaw bracket 40 and the left end open jaw bracket 42, respectively.

Figure 2:
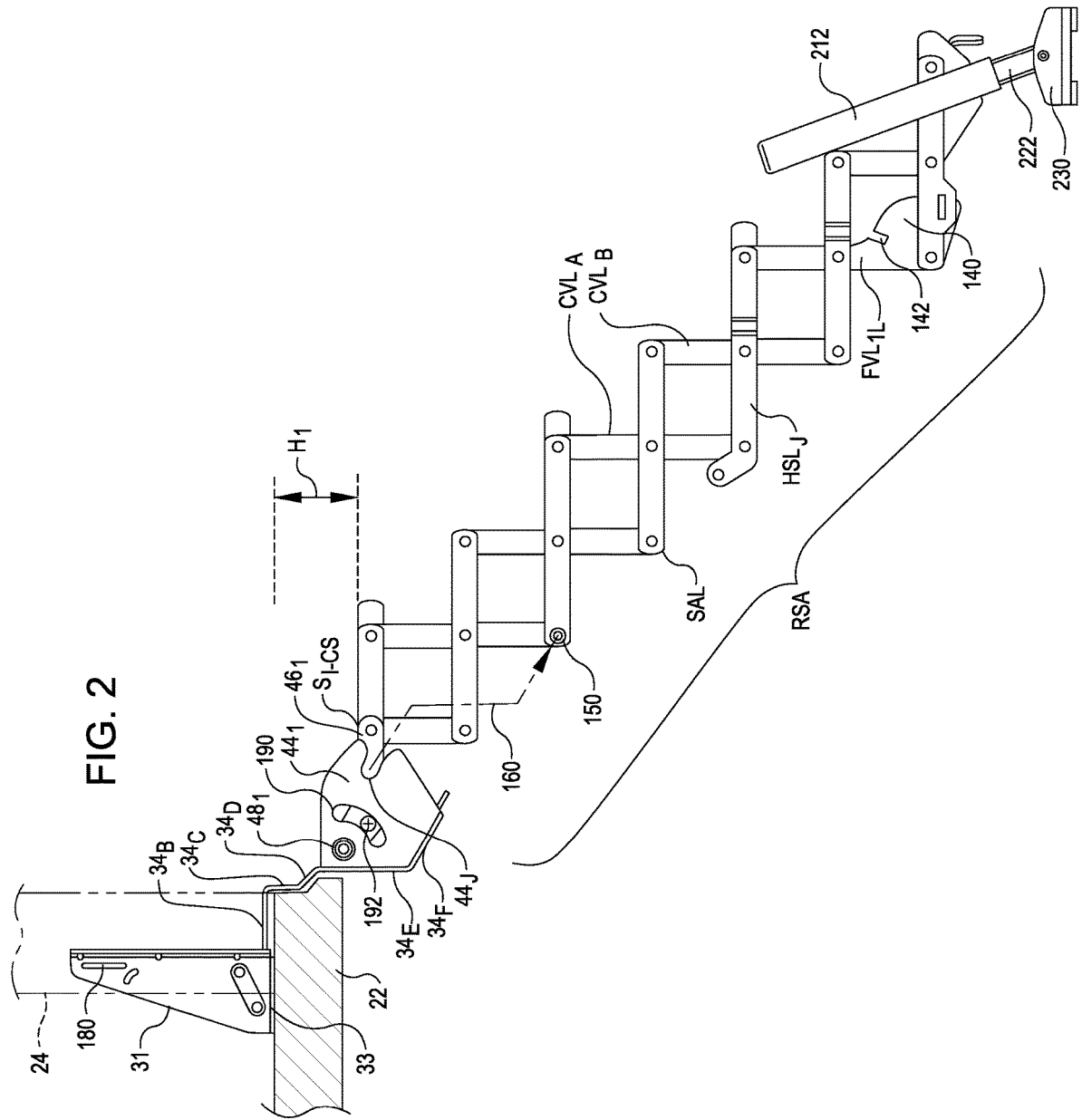
FIG. 2 is a left side elevation view (when viewed from the outside) of key components for an embodiment for a retractable stair system as just depicted in FIG. 1 above, and in particular illustrating a mounting bracket secured in a doorway, and with the sill cover plate extended outward and downward as enabled by pivotal attachment via left and right open jaw brackets to the mounting bracket, with retracting mechanism components affixed to the sill cover plate, and showing an extensible-retractable scissors stair assembly, and the use of an independently adjustable lower stair, as well as mounting feet.
Figure 3:
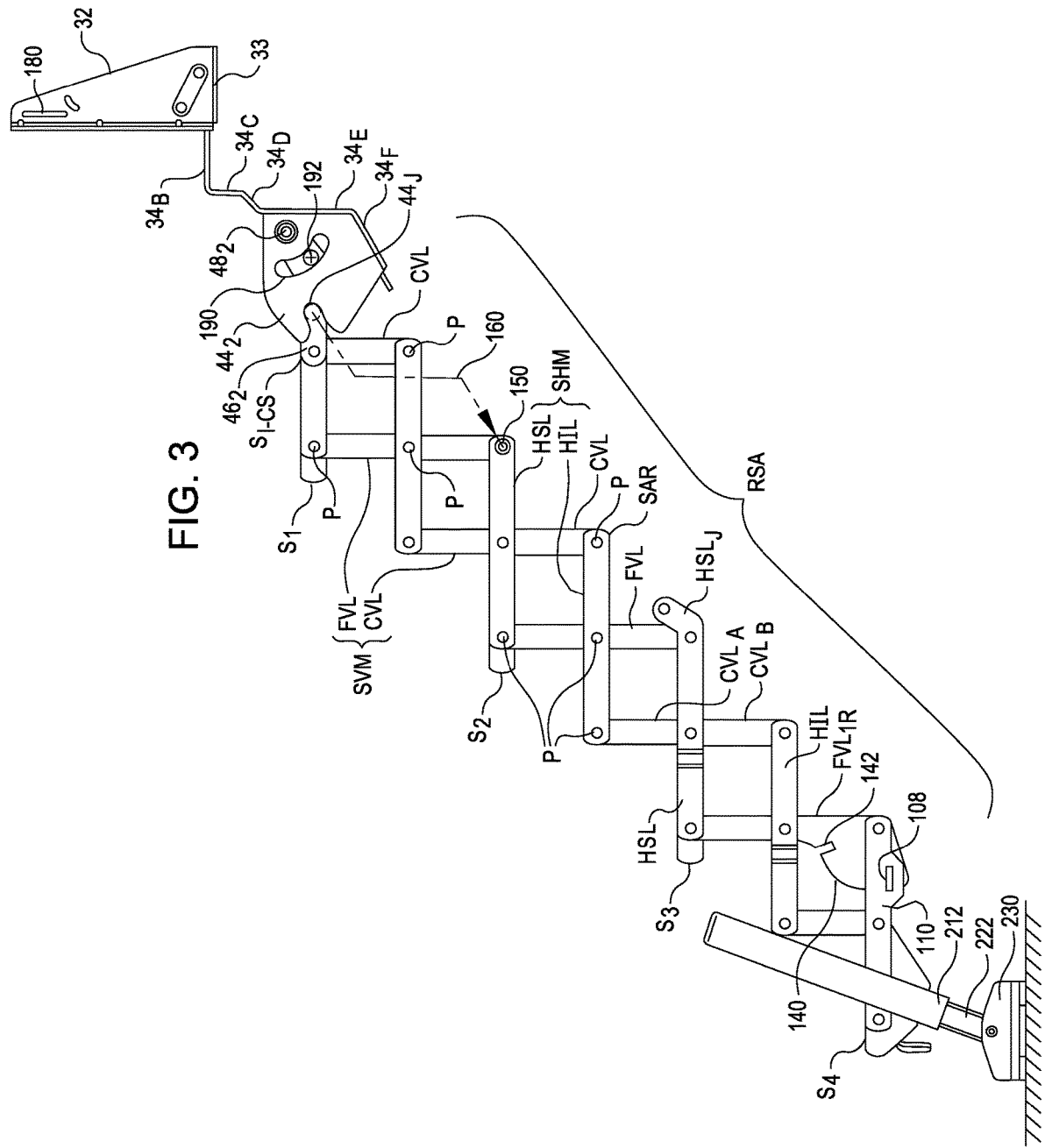
FIG. 3 is a right side elevation view of key components for an embodiment for a retractable stair system as just depicted in FIGS. 1 and 2 above, illustrating a mounting bracket as if secured in a doorway (not shown), but with the sill cover plate extended outward and downward as in FIGS. 1 and 2, as enabled by pivotal attachment to the mounting brackets via left and right open jaw brackets to the mounting bracket, with retracting mechanism components affixed to the sill cover plate, and showing an extensible-retractable scissors stair assembly, and the use of an independently adjustable lower stair, as well as mounting feet.

When a quick disconnect mechanism is provided, the left locking stud $72_1$ and the right locking stud $72_2$ each have an interior distal end, $72_{1-E}$ and $72_{2-E}$ respectively ($72_{1-E}$ is a mirror image of $72_{2-E}$). When the detachable stair system 20 is assembled and installed in a recreational vehicle doorway, the interior distal ends $72_{1-E}$ and $72_{2-E}$ of the left locking stud $72_1$ and the right locking stud $72_2$ are spaced apart a distance $D_D$, where $D_D$ is less than the width of the sill cover plate 34 (e.g. at edge 79 as seen in FIGS. 2, 3, and 4) adjacent the arcuate shaped guide slots 60 provided in the right end open jaw bracket 40 and the left end open jaw bracket 42. Importantly, the interior distal ends $72_{1-E}$ and $72_{2-E}$ of the left locking stud $72_1$ and of the right locking stud must be sufficiently long that they extend well into, or in an embodiment actually fully occupy the lateral thickness of the right end and left end open jaw brackets 40 and 42 and thus fit fully and snugly in guide slots 60, but are not so long that they extend too far toward each other (i.e. do not extend very far inwardly past—if at all inwardly past—an interior edge of left end open jaw bracket 42 and an interior edge of right end open jaw bracket 40), where they would tend to interfere with or prevent rotating passage of the ends of the sill cover plate 34 adjacent the open jaw brackets 40 and 42 when the detachable stair portion 21 is moved from a closed, upward stored position as seen in FIG. 8, to a outwardly and downwardly extended working position as seen in FIG. 1 or 4. When so constructed, and a suitable distance is provided between the interior distal ends $72_{1-E}$ and $72_{2-E}$ of the left locking stud $72_1$ (mirror image of and of the right locking stud $72_2$) and of the right locking stud $72_2$, the detachable stair portion 21, including the sill cover plate 34 and the right end and left end open jaw brackets 40 and 42 are freely pivotable on the left pivot stud $52_1$ and the right pivot stud $52_2$, while the locking studs $72_1$ and $72_2$ snugly fit and move in the arcuate shaped guide slots 60, to rotatably secure the detachable stair portion 21. In order to facilitate a suitable clearance for pivoting motion, the sill cover plate 34 may include cutout portions $34_Z$ in the ends of sill cover plate adjacent the right end and left end open jaw brackets 40 and 42. In an embodiment, cutouts may be provided in the thickness of the right end and left end open jaw brackets 40 and 42. In an embodiment, the right end open jaw bracket 40 (and mirror image left end open jaw bracket 42) may be affixed to the sill cover plate 34, by welding, such as by using welds $34_1$ and $34_2$ at panels $34_A$ and $34_B$ of the sill cover plate 34 as seen in FIG. 8.

In an embodiment, the inside surface $31_I$ of bracket 31 and the inside surface $32_I$ of bracket 32 may be spaced apart by a distance Ds. In an embodiment the alignment grooves 71 in the pivot studs $52_1$ and $52_2$ provide for spacing of the right outside surface $40_O$ and a left outside surface $42_O$ of the fixed plates provided by right end open jaw bracket 40 and a left end open jaw bracket 42 away from the inside surface $31_I$ of bracket 31 and the inside surface $32_I$ of bracket 32 by a clearance distance C. In an embodiment, clearance distance C may be larger than zero and up to about one quarter of an inch (¼"). In an embodiment, clearance distance C may be at least one eighth inch (⅛"). Thus, the overall width $W_O$ of the detachable stair portion 21, at least in that portion between brackets 31 and 32, is the combination of the distance $D_S$ less two times the clearance distance C.

Also, in order to enable the detachable stair portion 21 to pivot outward and downward (see FIGS. 1, 2, and 11), and inward and upward when the detachable stair portion 21 is returned to the stored position 30 as seen in FIG. 8, the distance $D_S$ (between the inside edge $31_I$ and $32_I$ and of brackets 31 and 32 respectively) is larger than the distance $W_O$ (the overall width of the detachable stair portion 21 at the outside edge $40_O$ and $42_O$ of right end open jaw and left end open jaw brackets 40 and 42 respectively). Thus, the clearance distances provided enable the detachable stair portion 21, including a quick disconnect upper end assembly with the sill cover plate 34 and the right end and left end open jaw brackets 40 and 42 which are freely pivotable on and between the left pivot stud $52_1$ and the right pivot stud $52_2$.

As also illustrated in FIG. 8, the detachable stair portion 21 includes a retractable stair assembly RSA which is folded into a compact position 30 for storage. In this position, the detachable stair portion 21 is pivotally supported between the left side mounting bracket 31 and the right side mounting bracket 32. In an embodiment, the detachable stair portion 21 may include most or all components other than bracket 31, bracket 32, a floor plate 33 which extends between bracket 31 and bracket 32, and the pivot studs $52_1$ and $52_2$, or mounting hardware, or adjustment hardware (if any) on the brackets 31 and 32. The floor plate 33 may be affixed to (e.g. by using fasteners), or integrally provided with (e.g. by welding or mechanical interlock), the left side mounting bracket 31 and the right side mounting bracket 32.

The precise shape and form of the sill cover plate 34 may be adjusted to fit over, and in an embodiment, to conform to threshold 22 or similar sill plate configuration (e.g. see FIG. 2) in a particular recreational vehicle in which the retractable stair system 20 is to be mounted. The sill cover plate 34 may have a sill cover plate base $34_B$ that is configured to be deployed in a substantially horizontal configuration when the detachable stair assembly RSA is in use so that a door of a recreational vehicle, such as a trailer door, pickup camper door, or motorhome door, may be closed above the sill cover plate 34. This is as depicted in FIG. 2, where in an embodiment the sill cover plate 34 may be configured to accommodate closing of a door 24 thereabove. Further, as seen in FIGS. 2 and 3, a sill cover plate 34 may be provided in a stylized S configuration. In an embodiment, a sill cover plate 34 may have multiple panels, such as panels $34_A$, $34_B$, $34_C$ $34_D$, and $34_E$, and $34_F$ in the configuration depicted in FIGS. 2, 3, and 8. In an embodiment, a multiple panel configuration (e.g. including panels $34_A$, $34_B$, $34_C$ $34_D$, and $34_E$, and $34_F$ as described) in a sill cover plate 34 may be provided as a one piece formed metal component. In an embodiment, where the sill cover plate 34 includes a plurality of panels as just described, the sill cover plate 34 may be sized and shape with panels including sections shaped to fit over a sill in a door of a recreational vehicle, while allowing the door of the recreational vehicle to close.

In an embodiment a section of the sill cover plate 34, such as panel $34_E$, and/or panel $34_F$ may be utilized as a support structure to which a scissor-like link mechanism is operatively affixed to the sill cover plate 34. In an embodiment, such connection may be completed using alignment brackets $44_1$ and $44_2$ mounted on at panel $34_E$, and/or panel $34_F$ to allow the scissor-like link mechanism to be attached, to effect coordinated movement of a number N (or N−1 stairs in case an independently deployable bottom stair is utilized) of stairs S in a series of stairs $S_1$ to $S_N$, wherein N is a positive integer of at least two. In various embodiments, N may be between two and six inclusive. In alternate embodiments (some not shown) a two-step ($S_1$, $S_2$) configuration, or a three step ($S_1$, $S_2$, $S_3$) configuration, or a four step (see $S_1$, $S_2$, $S_3$, and $S_4$) configuration, or a five step ($S_1$, $S_2$, $S_3$, $S_4$ and $S_5$), configuration, or a six step ($S_1$, $S_2$, $S_3$, $S_4$, $S_5$, and $S_6$) configuration, be provided for an extensible-retractable scissors stairs assembly RSA. Any one or more or all of the stairs $S_N$ may further include an upper surface that includes a non-skid surface portion NS. Latches, keepers, spacers, and the like which provide structure and function for the extensible-retractable scissors stairs assembly RSA may be advantageously provided as detailed herein, or as may be further described in the above identified patent that has been incorporated herein by reference. Likewise, extensible mounting legs and extensible mounting feet may be advantageously provided as detailed herein and as further described in the embodiments provided in the above identified patent that has been incorporated herein by reference.

In any event, the top stair $S_1$ in any group of stairs $S_1$, $S_2$, $S_3$, etc. may be secured at a selected height as provided in the design of the sill cover plate 34 and mounting hardware utilized, such as via use of a set of alignment brackets $44_1$ and $44_2$ attached to sill cover plate 34 at sill cover plate panel $34_E$, and/or panel $34_F$. As may be appreciated from FIG. 1 and as detailed in FIG. 4, the top stair $S_1$ may be pivotally attached to alignment bracket $44_1$ and $44_2$ via pivot brackets $46_1$ and $46_2$ at pivots $48_1$ and $48_2$. Then, stair $S_1$ is fixedly attached to pivot brackets $46_1$ and $46_2$ at the rear sides $S_{1-RS}$ of stair $S_1$ and near the center sides $S_{1-CS}$ of stair $S_1$. Thus, the height $H_1$ of a top stair $S_1$ below a flat portion $34_B$ of the sill cover plate 34 is primarily determined by the design of the sill cover plate 34 and the design of the pivot brackets $46_1$ and $46_2$.

Figure 11:
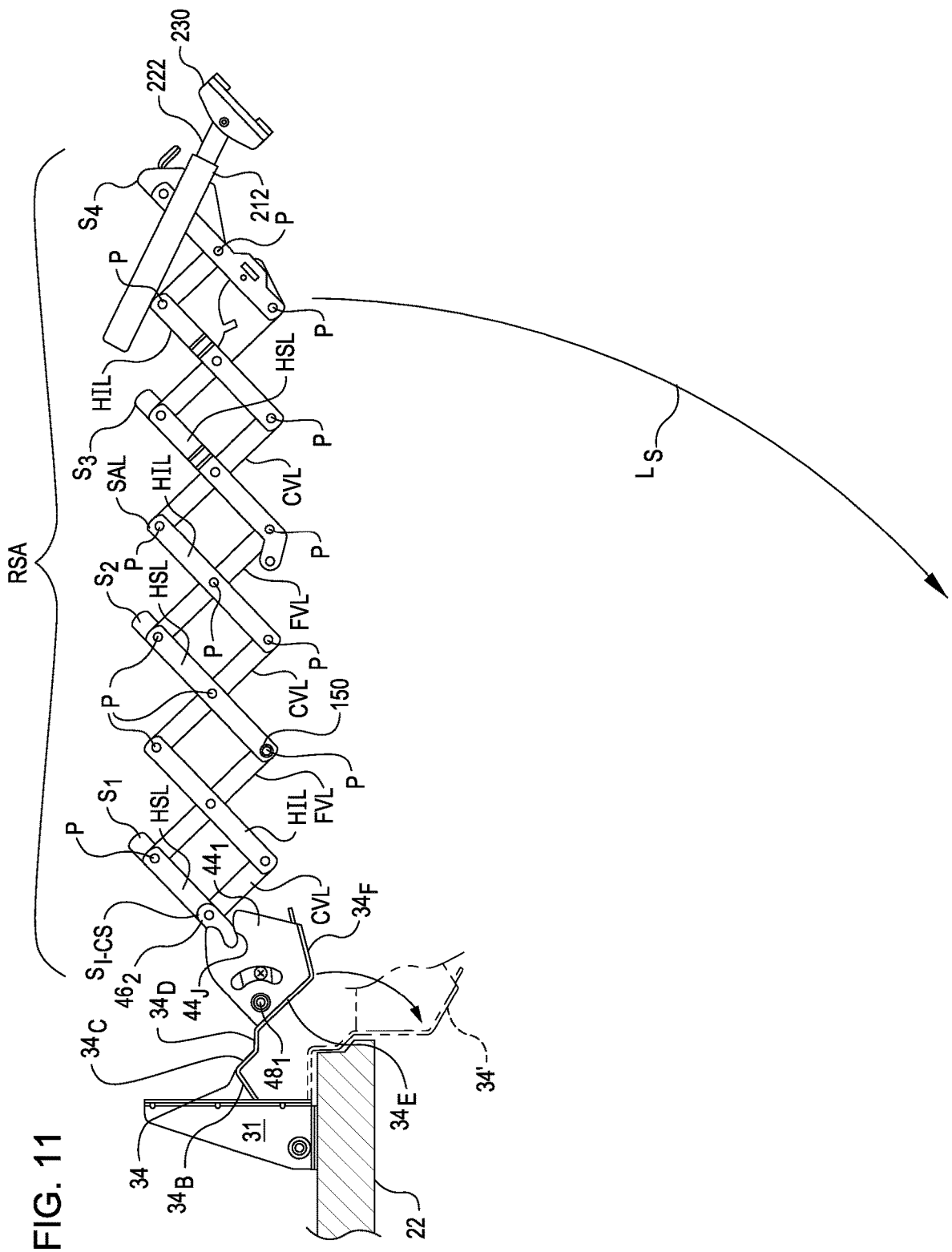
FIG. 11 is a left side view, similar to that shown in FIG. 2 above, but now showing how the scissor-like link mechanism of the retractable stair system is extended from the alignment brackets, prior to being lowered into a working, deployed position, where the sill plate pivots downward to rest on and cover a threshold of a doorway in a recreational vehicle.

In an embodiment, once the top stair $S_1$ is repositioned from a stowed position toward a downward deployed position, the retractable-extensible stair assembly RSA may be pulled out to fully extend the set of stairs to a desired overall height, and then lowered (see reference arrow $L_5$ in FIG. 11). The scissors-like construction provides for uniform spacing distance D between each of the stairs (for example, stairs $S_1$, $S_2$, and $S_3$) in a selected set of stairs, as generally illustrated in FIG. 10, other than the lowermost stair ($S_4$ in FIG. 10) which is independently deployable, as further discussed elsewhere herein.

Exemplary designs for a retractable stair assembly 20 for a recreational vehicle are provided herein. In various embodiments, a scissor-like link mechanism is provided in the form of a retractable-extensible stair assembly RSA, for effecting coordinated movement of a number N of stairs S in a series of stairs $S_1$ to $S_N$, wherein N is a positive integer of at least two, or in an embodiment, between two and six inclusive.

Each of the stairs S is securely affixed between (a) a right side interconnected scissor-like link assembly portion SAR comprising a plurality of substantially vertical members SVM and plurality of substantially horizontal members SHM, and (b) a left side interconnected scissor-like link assembly portion SAL, also comprising a plurality of substantially vertical members SVM and plurality of substantially horizontal members SHM. The plurality of substantially horizontal members SHM may be further described as including (a) horizontal stair links HSL and (b) horizontal intermediate links HIL (see FIG. 1, graphically indicating that SHM=HSL+HIL). The plurality of substantially vertical members SVM may be further described as including (a) first vertical links FVL, and (b) central vertical links CVL (see FIG. 1, graphically indicating that SVM=FVL+CVL). The use of the term "vertical" and "horizontal" is for reference only and should not be used to require absolute adherence to such orientations; rather, the terms are merely used as being generally descriptive, each to the other, when observing a retractable stair assembly in use, when deployed with stairs extended and with feet on a substrate below.

In an embodiment, the first vertical links FVL are pivotally connected to at least one of the horizontal stair links HSL at or near a stair front $S_F$, and extend downward to and are pivotally connected at or near the rear of a horizontal stair link HSL located immediately therebelow. The central vertical links CVL are pivotally connected (i) to horizontal stair links HSL at a location $S_I$ intermediate between a stair front $S_F$ and a stair back $S_B$ of a stair S, and (ii) to a horizontal intermediate link HIL situated immediately above and below that horizontal intermediate link HIL. For reference, pivotally connected points as mentioned above are generally indicated via use of the reference symbol P for pivot pin.

In some embodiments, at least a number N−1 of stairs S is extendible outward and downward from a stowed position to a fully extended position with substantially uniform vertical and horizontal spacing between each of the at least a number N−1 of stairs S, as is seen in FIG. 10. As also indicated in FIG. 10, in an embodiment an Nth stair $S_N$ in the number of stairs N, i.e. stair $S_4$ as shown in FIG. 10, is independently deployable. When stowed, the independently deployable stair N may be in the configuration illustrated in FIG. 10. When deployed, the independently deployable stair N may be in the configuration illustrated in FIG. 1.

In order to be able to independently deploy the Nth stair S, at the stair N−1 immediately above the Nth stair, the central vertical link CVL rising above and extending below the N−1 stair is split into two separate links, $CVL_A$ and $CVL_B$ as shown in FIGS. 1 and 2. Operationally, the benefit of the split links just described may be better appreciated by reference to FIG. 4. Otherwise, the separate links $CVL_A$ and $CVL_B$ are pivotally connected in the manner already described, which is (i) to horizontal stair links HSL at a location $S_I$ intermediate between a front $S_F$ and a back $S_B$ of stair $S_{N-1}$, and (ii) to a horizontal intermediate link HIL situated immediately above and below that horizontal intermediate link HIL. When the independently deployable bottom stair $S_N$ is pushed back for storage, bottom portion, namely the lower separate central vertical link $CVL_B$ moves rearward, pivoting at the intermediate pivot $P_I$ while the top portion, separate central vertical link $CVL_A$ remains in a vertical position to space stair $S_{N-1}$ uniformly with respect to other stairs, as controlled by the remainder of the retractable stair assembly RSA. Additionally, a special horizontal stair link $HSL_J$ is provided on the N−1 star, where a guide bushing 58 is provided on a J shaped upturned arm. The guide bushings 58 are sized and shaped to urge the first vertical link FVL outward from the guide bushing 58, to maintain spacing when using the separate central vertical links $CVL_A$ and $CVL_B$ as described above.

Figure 5:
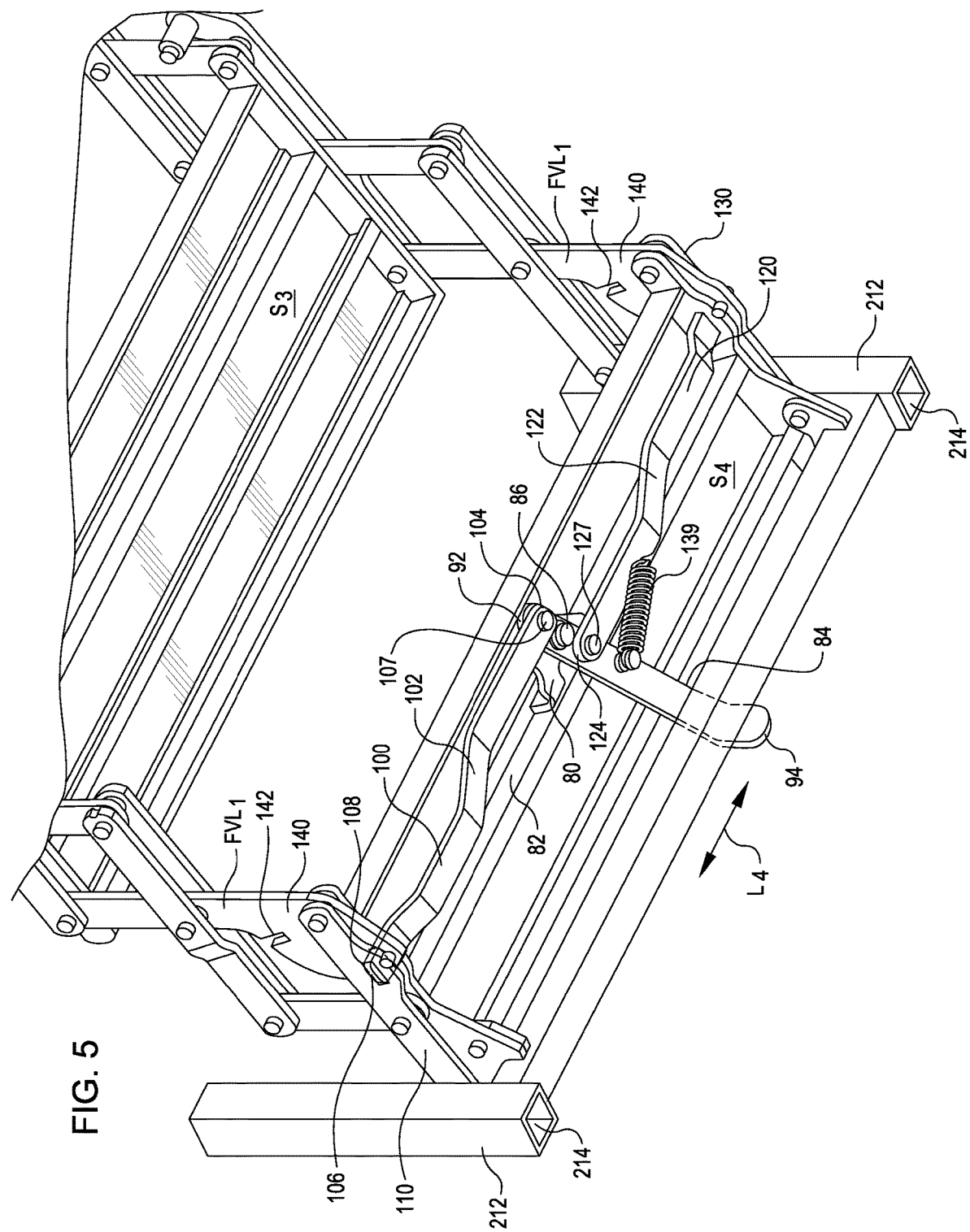
FIG. 5 is a bottom view retractable stair system as just provided in FIG. 1 above, showing the underside of an embodiment for an independently deployable bottom stair, and particularly showing the details for an embodiment of a stair latch mechanism, with the latch in a down-locked position with the stair in a down, deployed position, as well as showing the mounting tubes for securing the independently adjustable mounting feet therein, as used for secure placement of the stair system above uneven ground.
Figure 6:
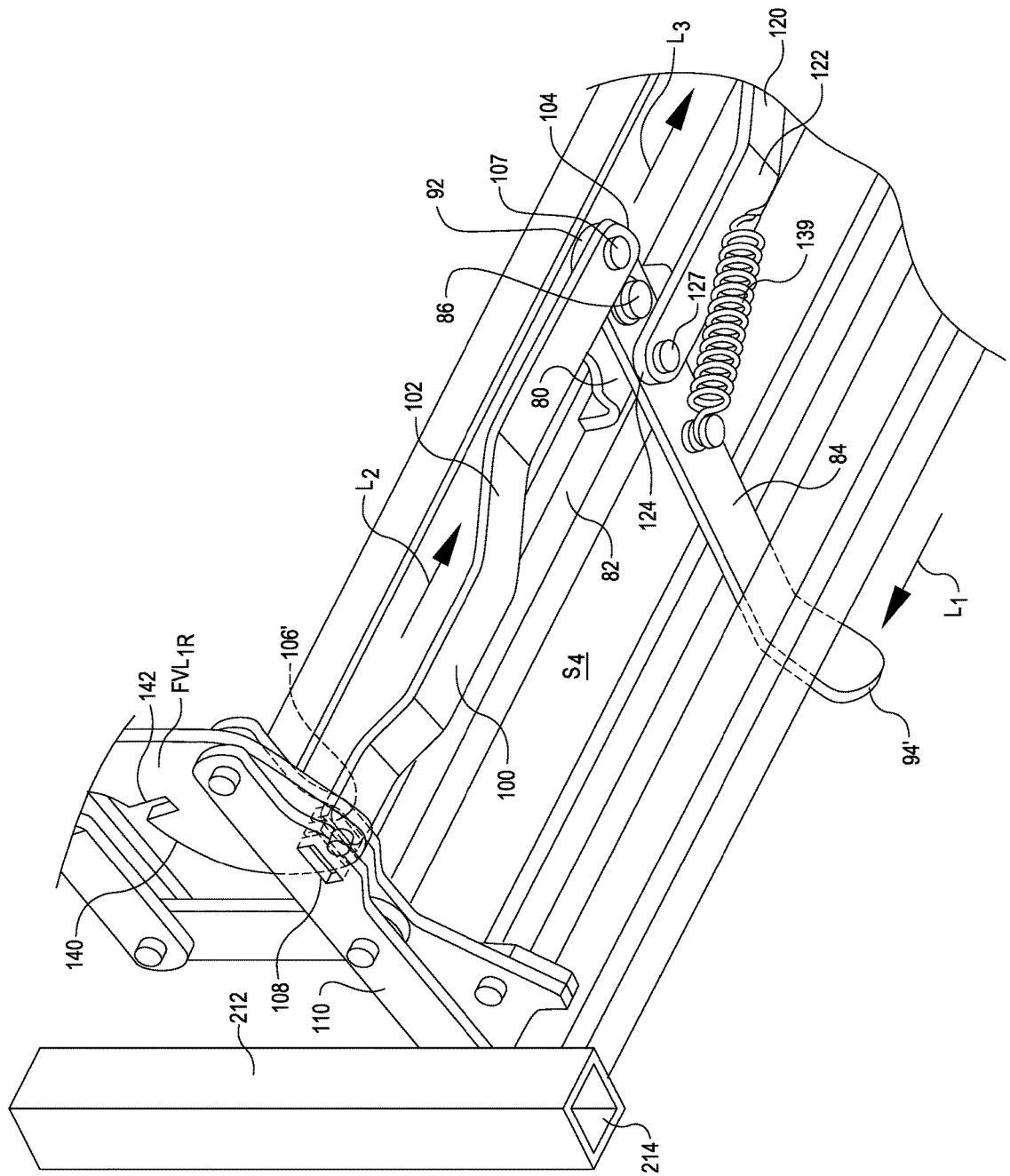
FIG. 6 is a perspective view of an embodiment for a pivotally storable retractable stair system, similar to the details just illustrated in FIG. 5 above, and showing the underside of an embodiment for an independently deployable lower stair, and now particularly illustrating the details for an embodiment of a stair latch mechanism with the latch in an unlocked position, ready for upward movement of the lower independent stair to an upward and secured position, as well as showing the mounting tubes for securing the independently adjustable mounting feet therein, as used for secure placement of the retractable stair system above uneven ground.
Figure 7:
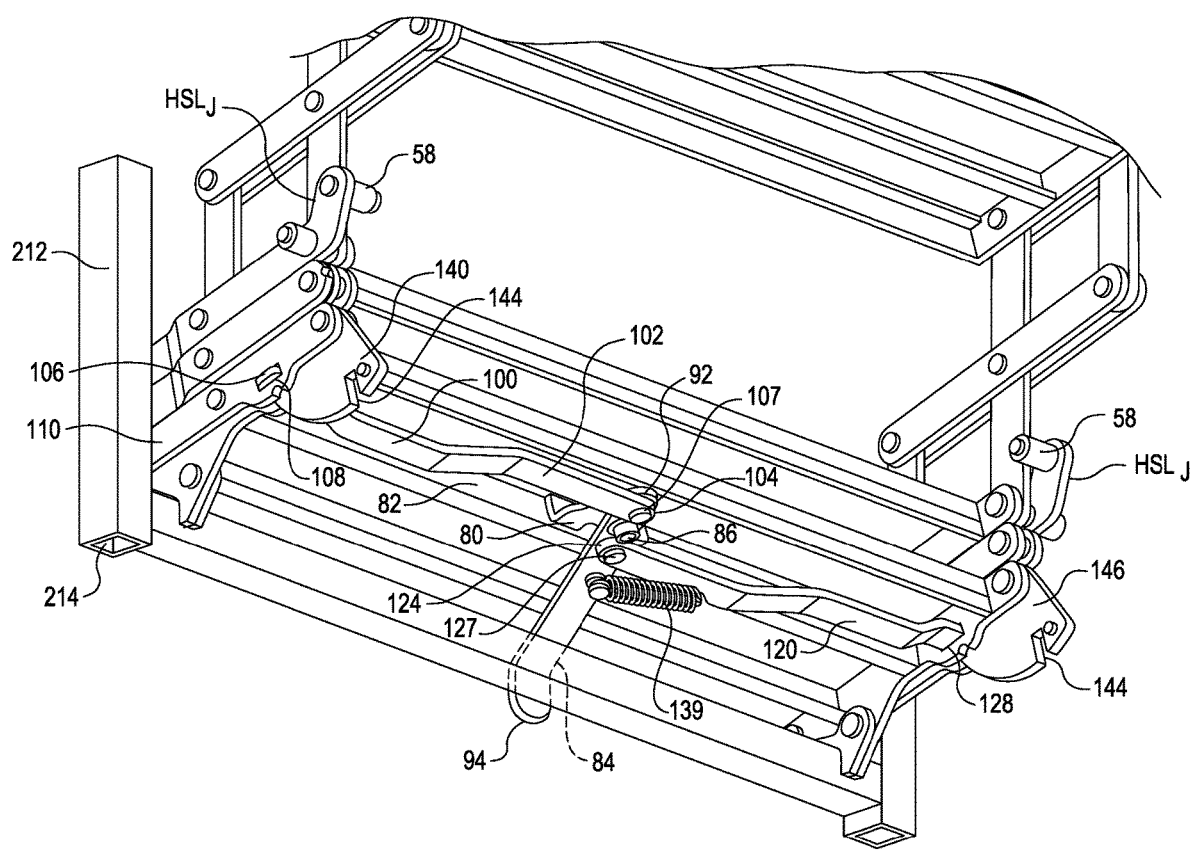
FIG. 7 is a perspective of an embodiment for a retractable stair system, with a view similar to that just depicted in FIG. 6 above, but now showing the independently retractable lower stair system depicted in a compact arrangement with the lower stair retracted, and the latch in an uplocked position with the lower stair retracted and stowed.

In order to secure the independently deployable stair N in either a stowed position or in a deployed position for use, a latch mechanism may be provided, which in an embodiment may be in form of the latch mechanism illustrated in FIGS. 5, 6, and 7. The latch mechanism may include (a) latch mounting bracket 80 configured to be mounted directly or indirectly to the underside of the Nth stair S, or to a support member 82 attached to, on, or forming a part of the Nth stair, (b) a latch lever 84 and a latch pivot pin 86, and (c) a first latch slide bar 100. A second latch slide bar 120 may also be provided. The latch lever 84 is pivotally mounted at latch pivot pin 86 to the latch mounting bracket 80. The latch lever 84 has an actuator end 92 and a handle end 94. The actuator end 92 extends outward beyond the latch pivot pin 86, distant from the handle end 94.

The first latch slide bar 100 is provided with an elongate body 102 extending between a first pivot end 104 and a first locking end 106. The first pivot end 104 is pivotally attached by pivot 107 to the latch lever 84 at or near the actuator end 92 of the latch lever 84. The first locking end 106 is sized and shaped for interfitting engagement with a first catch 108 provided by, or in a horizontal stair link HSL at the stair $S_N$, or in a horizontal catch bar 110, addition to the horizontal stair link HSL. In FIG. 5, the first locking end 106 is shown engaged with and fitting in the first catch 108. In FIG. 6, the first locking end 106 is shown disengaged from the first catch 108, with the latch lever 84 moved at the handle end 94, in the direction of reference arrow $L_1$ from position 94 (FIG. 6) to position 94' (FIG. 6), so that first locking end 106 has moved to position 106'. At the same time, the first slide latch 100 moves in the direction of reference arrow $L_2$ and the actuator end 92 of latch lever 84 moves in the direction of reference arrow $L_3$. In FIG. 5, the alternate movement direction as indicated by reference arrow $L_4$ shows movement of latch lever 84 at the handle end 94 from position 94 to and from the position 94' shown in FIG. 6. In FIG. 7, the first locking end 106 is shown reengaged with and fitting in the first catch 108, but now also shows the independently deployed stair SN in an upward, stowed position. In general, the pivoting movement of the latch lever 84 about the latch pivot pin 86 reversibly disengages the first locking end 106 from the first catch 108. In an embodiment, the first catch 108 may be provided as a horizontal catch bar 110 on the right side of a retractable-extendable stair assembly RSA.

In an embodiment, a latch mechanism may also include a second latch slide bar 120 having an elongate body 122 extending between a second pivot end 124 and a second locking end 126 (see FIG. 4). The second pivot end 124 is operably attached by pivot 127 to the latch lever 84 near the latch pivot pin 86 on the handle end 94 of the latch lever 84 from the latch pivot pin 86. The second locking end 126 is sized and shaped for interfitting engagement with a second catch 128. The second catch 128 may be provided by or in a horizontal stir link HSL at the stair $S_N$, or in a horizontal catch bar 130 provided in addition thereto. In an embodiment, the second catch 128 is provided in a horizontal catch bar 130 on the left side of the retractable-extendable stair assembly. In any event, moving the latch lever 84 provides pivoting movement of the latch lever 84 about the latch pivot pin 86 and reversibly disengages the second locking end 126 from the second catch 128. In FIG. 8, the movement of latch lever 84 from a latched location (latch handle at location 94) to an unlatched location (latch handle at location 94') can be seen by movement from reference line 136 (latched condition) to reference line 138 (unlatched condition).

In an embodiment, a latch mechanism as just described may also include a biasing member 139 coupled with the latch lever 84, to urge the latch lever toward a closed and locked position. In an embodiment, the biasing member 139 may be located between the latch lever 84 and either the first latch slide bar 100 or the second latch side bar, 120 wherein the biasing member 139 urges the first latch slide bar 100 toward the first catch 108. In an embodiment, the biasing member 139 may be located between the latch lever 84 and either the first latch slide bar 100 or the second latch side bar 120 wherein the biasing member 139 urges the second latch slide bar 120 toward the second catch 128. In various embodiments, the biasing member may comprise a spring. In an embodiment, a tension spring may be provided.

In an embodiment, a further locking mechanism may be provided when an independently deployable bottom stair $S_N$ is provided. In such a design, a right side lowermost first vertical link $FVL_{1R}$ further comprises a first locking plate portion 140. The first locking plate portion 140 includes an uplock notch 142 (see FIGS. 2, 3, and 5) and a downlock notch 144 (see FIG. 7). In operation, extension or retraction of the retractable stair assembly RSA rotates the lowermost first vertical link $FVL_1$ an angular distance so that the uplock notch 142 or the downlock notch 144 in the first locking plate portion 140 are alternately aligned with the first catch 108, for receipt of and wherein such alignment is at the uplock notch 142 when the independently deployable Nth stair is stowed, and wherein such alignment is at the downlock notch 144 when the independently deployable Nth stair is deployed and extended forward for use.

In an embodiment, a left side lowermost first vertical link $FVL_{1L}$ further includes a second locking plate portion 146. The second locking plate portion 146 also is provided with an uplock notch 142 (see FIGS. 2, 3, and 5) and a downlock notch 144 (see FIG. 7). In operation, the extension or retraction of the retractable stair assembly RSA rotates the lowermost first vertical links $FVL_{1R}$ and $FVL_{1L}$ an angular distance so that the uplock notch 142 or the downlock notch 144 in the second locking plate 146 is aligned with second catch 128. In an embodiment, the first 140 and second 146 locking plates are configured so that alignment with the first catch 108 and second catch 128 is at the uplock notch 142 when the independently deployable Nth stair is stowed. Similarly, such alignment is at the downlock notch 144 when the independently deployable Nth stair is deployed and ready for use. In other words, the first catch 108 and second catch 128 are aligned with the downlock notch 144 when the stair $S_N$ is in the extended, deployed condition, and with the uplock notch 142 when the stair $S_N$ is in the compact, stowed condition (thus, downlock notch 144 is unused and exposed, as shown in FIG. 7).

Figure 9:
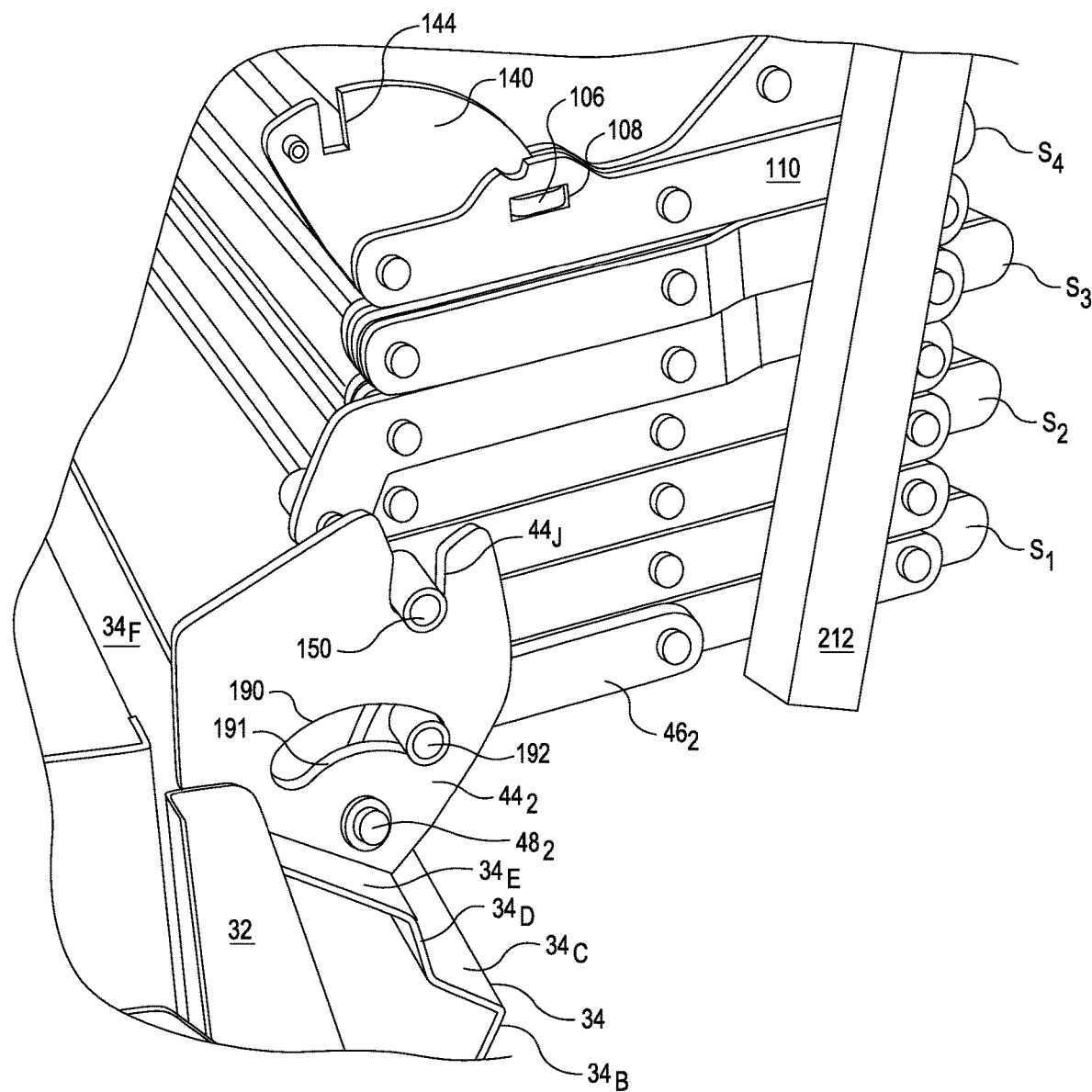
FIG. 9 is a perspective view of an embodiment for a retractable stair system similar to that shown in FIG. 8, showing the retractable stair system embodiment depicted in a compact arrangement with all stair steps retracted and the stairs being pivotally turned upward for storage, and showing the independently deployable bottom stair in the uplock, stowed position, and an alignment bracket affixed to a section of the sill cover plate, with the alignment bracket securing a latch pipe in an open jaw and a longitudinal support in an arcuate slot therein.

Attention is now directed to FIGS. 2, 3, and 11, where operation of a retractable stair assembly will be further explored. The left and right alignment brackets $44_1$ and $44_2$, respectively, each further comprise an outwardly oriented open jaw 44J. The open jaw 44J is sized and shaped to securely receive therein a latch pipe 150 segment. The latch pipe 150 segments are affixed substantially horizontally and outwardly from each side of a rear portion $S_R$ of a second from a top stair ($S_2$) in a number N of stairs in the retractable stair assembly, so that a latch pipe segment is received in the open jaw of each alignment bracket, when the retractable stair assembly is in a closed, stored position, as seen in FIG. 9. In an embodiment, latch pipe segments 150 may be provided with friction minimizing bushing surface, such as by use of high density polyethylene (or similar material) cylindrical outer surface. From the stored position as seen in FIG. 9, the retractable stair assembly RSA may be expanded, as indicated in FIG. 11, before being lowered into place for use, as indicated in FIGS. 2 and 3. In the deployment process, latch pipe 150 segment is moved from the open jaw 44J in the direction of reference arrow 160 shown in FIGS. 2 and 3. Placement of the latch pipe 150 segments in the open jaw $44_J$ provides secure support for the retractable stair assembly and accompanying feet, when stored in the upright, but upside down position shown in FIG. 9, ready for over the road transport in the recreational vehicle. As more clearly seen in FIGS. 3 and 4, in various embodiments, one or both of the mounting brackets 31 and 32 further include a latch slot 180, and the detachable stair system 20 further includes at least one latch 184. In an embodiment, latch 184 may be a slide latch. In an embodiment, latch 184 may include a body 186 having a latch tongue 188 portion sized and shaped for mating engagement with the latch slot 180.

Returning now to operation of alignment brackets $44_1$ and $44_2$, as best seen in FIG. 9, the alignment brackets $44_1$ and $44_2$ each further include an arcuate alignment slot 190 defined by edge wall portions 191. The arcuate alignment 190 slot sized and shaped for receiving and containing therein and for secure sliding engagement therein a guide pipe 192 segment. Guide pipe 192 segments are affixed substantially longitudinally and outwardly from each side of a rear portion $S_R$ of a top stair $S_1$ in a number N of stairs in the retractable stair assembly RSA. Basically, the guide pipe 192 segment is caged in the arcuate alignment slot 190, and the guide pipe 192 segment moves in an arc in the alignment slot 190 as the retractable stair assembly RSA moves from a closed, stored position (see FIG. 9) to an open, deployed position (see FIGS. 1, 2, and 3). In an embodiment, guide pipe 192 segments may be provided with friction minimizing bushing surface, such as by use of high density polyethylene (or similar material) cylindrical outer surface.

As seen in FIGS. 1, 4, and 10, for support, a retractable stair system may include a first extensible support leg 200 and a second extensible support leg 202. The first extensible support leg 200 is extendable to a selected height $H_{F1}$, and the second extensible support leg 202 is extendable to a selected height $H_{F2}$. As shown in FIG. 4, the first extensible support leg 200 and the second extensible support leg 202 are independently extendable, so that selected height $H_{F1}$ and selected height $H_{F2}$ may be the same or different, as can be appreciated by reference arrow 204, which indicates that support legs 200 and 202 can be extended by different lengths to accommodate an uneven substrate 210. In an embodiment illustrated, each of the first 200 and second 202 extensible support legs have an upper support member 212 having a tubular portion with interior sidewalls 214 (see FIG. 5) The upper support member 212 also is provided with a plurality of holes 220 through the tubular portion of upper support member 212, as defined by edgewalls in the upper support member 212. A lower support member, 222 is provided. The lower support member 222 is sized and shaped for sliding engagement within the upper support member 212. The lower support member 222 is further provided with an outwardly biased detent 224 sized and shaped to fit in one of the holes 222 in the tubular portion of upper support member 212. The selected height $H_{F1}$ and selected height $H_{F2}$ of footpad 230 necessary to reach downward for support by substrate 210 (see FIG. 4) are each adjustable by manipulation of the detents 224 to change the position of the lower support member 222 within the upper support member 212, so as to lengthen or shorten the selected height $H_{F1}$ or selected height $H_{F2}$.

It is to be appreciated that the retractable stair system with a detachable stair portion, and which is mountable in the doorway of a vehicle as disclosed herein, is an appreciable improvement in the art of stairs for vehicles. The novel design for a retractable stair system with a detachable stair portion addresses the problem of how to efficiently store a stair system for recreational vehicles, while minimizing space required for the stairs when deployed. And, the adjustments provide for advantageous use above differing or uneven substrates, such as rocky ground located below the stairs at the location of a parked vehicle. The embodiments have been thoroughly described to enable those of ordinary skill in the art to make and use the invention, including embodiments which utilize aircraft grade aluminum and stainless steel components, for corrosion resistance during years of outdoor use, such as on various camper designs.

Although only a few exemplary embodiments have been described in detail, various details are sufficiently set forth in the drawings and in the specification provided herein to enable one of ordinary skill in the art to make and use the invention(s), which need not be further described by additional writing in this detailed description. It will be readily apparent to those skilled in the art that the retractable stair system with quick disconnect for a removal stair portion, and with an independently deployable lower step, may be modified from those embodiments provided herein, without materially departing from the novel teachings and advantages provided.

The aspects and embodiments described and claimed herein may be modified from those shown without materially departing from the novel teachings and advantages provided by this invention, and may be embodied in other specific forms without departing from the spirit or essential characteristics thereof. Therefore, the embodiments presented herein are to be considered in all respects as illustrative and not restrictive. As such, this disclosure is intended to cover the structures described herein and not only structural equivalents thereof, but also equivalent structures. Numerous modifications and variations are possible in light of the above teachings. It is therefore to be understood that within the scope of the appended claims, the invention(s) may be practiced otherwise than as specifically described herein. Thus, the scope of the invention(s), as set forth in the appended claims, and as indicated by the drawing and by the foregoing description, is intended to include variations from the embodiments provided which are nevertheless described by the broad interpretation and range properly afforded to the plain meaning of the claims set forth below.

The invention claimed is:

1. A retractable stair assembly for a recreational vehicle, comprising:
   (a) a scissor-like link mechanism for effecting coordinated movement of a number N of stairs S in a series of stairs $S_1$ to $S_N$, wherein N is a positive integer equal to two or more, and wherein each of the stairs S is securely affixed between a left scissors assembly and a right scissors assembly, the scissor-like link mechanism including
      (i) a right side interconnected scissor-like link portion comprising a plurality of substantially vertical members and plurality of substantially horizontal members;
      (ii) a left side interconnected scissor-like link portion comprising a plurality of substantially vertical members and plurality of substantially horizontal members
      (iii) wherein (A) the plurality of substantially horizontal members include horizontal stair links affixed to left and right sides of the stairs, and to horizontal intermediate links, and (B) the plurality of substantially vertical links include (1) first vertical links pivotally connected to at least one of the horizontal stair links at or near a stair front, and extend downward to and are pivotally connected at or near a rear of a horizontal stair link immediately therebelow, and (2) central vertical links are pivotally connected (i) to one of the horizontal stair links at a location intermediate between a front and a back of a stair, and (ii) to horizontal intermediate links situated above and below;
   (b) wherein at least a number N−1 of stairs is extendible outward and downward from a stowed position to a fully extended position with substantially uniform vertical and horizontal spacing between each of the at least a number N−1 of stairs; and
   (c) wherein an Nth stair in the number of stairs N is independently deployable.

2. A retractable stair assembly as set forth in claim 1, further comprising a a latch mechanism for an independently deployable Nth stair, the latch mechanism comprising:
   a latch mounting bracket configured to be mounted, directly or indirectly, to the Nth stair;
   a latch lever and a latch pivot pin, the latch lever pivotally mounted to the latch mounting bracket at the latch pivot pin, the latch lever having an actuator end and a handle end, the actuator end extending outward beyond the latch pivot pin;
   a first latch slide bar having an elongate body extending between a first pivot end and a first locking end, the first pivot end pivotally attached to the latch lever at or near the actuator end of the latch lever, and the first locking end sized and shaped for interfitting engagement with a first catch; and
   wherein pivoting movement of the latch lever about the latch pivot pin reversibly disengages the first locking end from the first catch.

3. A retractable stair assembly as set forth in claim 2, wherein the first catch is provided in a catch bar on a side of the retractable-extendable stair assembly.

4. A retractable stair assembly as set forth in claim 2, wherein the first catch is provided in a right catch bar on the right side of the retractable-extendable stair assembly.

5. A retractable stair assembly as set forth in claim 2, further comprising:
   a second latch slide bar having an elongate body extending between a second pivot end and a second locking end, the second pivot end operably attached for pivotal motion to the latch lever near the latch pivot pin on the handle end of the latch lever from the latch pivot pin, and the second locking end sized and shaped for interfitting engagement with a second catch; and
   wherein pivoting movement of the latch lever about the latch pivot pin reversibly disengages the second locking end from the second catch.

6. A retractable stair assembly as set forth in claim 5, wherein the second catch is provided in a catch bar on a side of the retractable-extendable stair assembly.

7. A retractable stair assembly as set forth in claim 6, wherein the second catch is provided in a left catch bar on the left side of the retractable-extendable stair assembly.

8. A retractable stair assembly as set forth in claim 2, wherein a lowermost first vertical link further comprises a first locking plate portion, the first locking plate portion including an uplock notch and a downlock notch, and where extension or retraction of the retractable stair assembly rotates the first vertical link an angular distance so that the uplock notch or the downlock notch in the first locking plate portion are alternately aligned with the first catch, and wherein such alignment is at the uplock notch when the independently deployable Nth stair is stowed, and wherein such alignment is at the downlock notch when the independently deployable Nth stair is deployed.

9. A retractable stair assembly as set forth in claim 5, wherein a lowermost first vertical link further comprises second locking plate portion, the second locking plate portion including an uplock notch and a downlock notch, and where extension or retraction of the retractable stair assembly rotates the first vertical link an angular distance so that the uplock notch or the downlock notch in the second locking plate portion are alternately aligned with the second catch, and wherein such alignment is at the uplock notch when the independently deployable Nth stair is stowed, and wherein such alignment is at the downlock notch when the independently deployable Nth stair is deployed.

10. A retractable stair assembly as set forth in claim 1, further comprising:
    a pair of mounting brackets, the pair of mounting brackets including a left mounting bracket and a right mounting bracket, the pair of mounting brackets including a left pivot stud and a right pivot stud on the left mounting bracket and on the right mounting brackets, respectively;
    a pair of pivot brackets, the pivot brackets sized and shaped for pivoting motion on the left and right pivot studs; and
    a sill cover plate, the sill cover plate affixed between the pivot brackets, and wherein the scissor-like link mechanism is operably connected to the sill cover plate, to enable the retractable stair assembly to pivot outward with the sill cover plate, for extension between a stowed position and an extended, deployed position.

11. A retractable stair assembly as set forth in claim 10, wherein the pair of mounting brackets are mounted to, and spaced apart by, a floor plate, to provide a one-piece mounting structure.

12. A retractable stair assembly as set forth in claim 11, wherein the one-piece mounting structure is configured for mounting in a door frame of the recreational vehicle.

13. The retractable stair assembly as set forth in claim 10, wherein the sill cover plate further comprises a plurality of panels, the plurality of panels including sections shaped to fit over a sill in a door of a recreational vehicle, while allowing the door of the recreational vehicle to close.

14. The retractable stair assembly as set forth in claim 10, further comprising a set of alignment brackets, and wherein the sill cover plate further comprises a plurality of panels, and wherein the set of alignment brackets is affixed to one or more of the panels, and wherein the scissor-like link mechanism is operably affixed to the set of alignment brackets.

15. The retractable stair assembly as set forth in claim 14, wherein the alignment brackets each further comprise an outwardly oriented open jaw, the open jaw sized and shaped to securely receive therein a latch pipe segment, and wherein the latch pipe segments are affixed substantially horizontally and outwardly from each side of a rear portion of a second from a top stair in a number N of stairs in the retractable stair assembly, so that a latch pipe segment is received in the open jaw of each alignment bracket, when the retractable stair assembly is in a closed, stored position.

16. The retractable stair assembly as set forth in claim 15, wherein the alignment brackets each further comprise an arcuate alignment slot, the arcuate alignment slot sized and shaped to securely receive therein a guide pipe segment, and wherein guide pipe segments are affixed substantially longitudinally and outwardly from each side of a rear portion of a top stair in a number N of stairs in the retractable stair assembly, so that a guide pipe segment is caged in the arcuate alignment slot, and the guide pipe segment moves in an arc in the alignment slot as the retractable stair assembly moves from a closed, stored position to an open, deployed position.

17. The retractable stair assembly as set forth in claim 10, wherein scissor-like link mechanism is pivotally connected to the alignment brackets, to enable the retractable stair assembly to pivot outward from the sill cover plate, for extension between a stowed position and an extended, deployed position.

18. The retractable stair assembly as set forth in claim 10, wherein the sill cover plate further comprises a plurality of panels, the plurality of panels including sections shaped to fit over a threshold at a door in the recreational vehicle.

19. A retractable stair assembly as set forth in claim 10, wherein each of the stairs S in the series of stairs $S_1$ to $S_N$ further comprises an upper surface, and wherein the upper surface further comprises a non-skid surface portion.

20. A retractable stair system for a vehicle as set forth in claim 10, further comprising a first extensible support leg and a second extensible support leg, and wherein the first extensible support leg is extendable to a selected height $H_{F1}$, and wherein the second extensible support leg is extendable to a selected height $H_{F2}$, and wherein the first extensible support leg and the second extensible support leg are independently extendable, so that selected height $H_{F1}$ and selected height $H_{F2}$ may be the same or different.

21. A retractable stair system for a vehicle as set forth in claim 20, wherein each of the first and second extensible support legs comprise an upper support member having a tubular portion with interior sidewalls, the upper support member having a plurality of holes defined by edgewalls along a vertical line in the tubular portion;

a lower support member, the lower support member sized and shaped for sliding engagement within the upper support member, and further comprising an outwardly biased detent sized and shaped to fit in one of the holes in the tubular portion; and wherein the selected height $H_{F1}$ and selected height $H_{F2}$ are each adjustable by manipulation of the detent to change the position of the lower support member within the upper support member, so as to lengthen or shorten the selected height $H_{F1}$ or selected height $H_{F2}$.

22. A retractable stair system for a vehicle as set forth in claim 20, wherein each of the first and second extensible support legs further comprise a foot pad, the foot pad pivotally connected to the lower support member.

23. A retractable stair system as set forth in claim 10, wherein the pair of pivot brackets comprise a right end open jaw bracket and a left end open jaw bracket, the right end open jaw bracket affixed to a right end of the sill cover plate, and the left end open jaw bracket affixed to a left end of the sill cover plate; and wherein the right end open jaw bracket and the left end open jaw bracket are sized and shaped for engagement with and pivoting movement about the left pivot stud and the right pivot stud, respectively, or for disengagement by hand from the left pivot stud and from the right pivot stud.

24. A retractable stair system as set forth in claim 23, wherein the right end open jaw bracket and the left end open jaw bracket each comprise fixed plates, each of which comprises a pivot end in which a generally U-shaped pivot stud receiver is defined by an interior sidewall having a proximal end sized and shaped for interfitting pivotal engagement with a pivot stud.

25. A retractable stair system as set forth in claim 24, wherein the right end open jaw bracket and the left end open jaw bracket each further comprises, spaced radially outwardly from a center of rotation about the left pivot stud and about the right pivot stud, respectively, an arcuate shaped guide slot, the arcuate shaped guide slot having a proximal end and a curved opening extending away from the proximal end, wherein the arcuate shaped guide slot is defined between an interior guide slot edge and an inside edge of an extending finger.

26. A retractable stair system as set forth in claim 25, wherein the left mounting bracket and the right mounting bracket each further comprise a locking stud, and wherein the locking studs and the arcuate shaped guide slots are sized and shaped for secure interfitting arcuate sliding motion therebetween.

27. A latch mechanism for a retractable-extendable stair assembly, the retractable-extendable stair assembly having a right side and a left side and an independently deployable Nth stair, the latch mechanism comprising:

a latch mounting bracket configured to be mounted directly or indirectly to the independently deployable Nth stair;

a latch lever and a latch pivot pin, the latch lever pivotally mounted to the latch mounting bracket at the latch pivot pin, the latch lever having an actuator end and a handle end, the actuator end extending outward beyond the latch pivot pin;

a first latch slide bar having an elongate body extending between a first pivot end and a first locking end, the first pivot end pivotally attached to the latch lever at or near the actuator end of the latch lever, and the first locking end sized and shaped for interfitting engagement with a first catch; and wherein pivoting movement of the latch lever about the latch pivot pin reversibly disengages the first locking end from the first catch.

28. A latch mechanism as set forth in claim 27, wherein the first catch is provided in a catch bar on a side of the retractable-extendable stair assembly.

29. A latch mechanism as set forth in claim 27, wherein the first catch is provided in a right catch bar on the right side of the retractable-extendable stair assembly.

30. A latch mechanism as set forth in claim 27, further comprising:

a second latch slide bar having an elongate body extending between a second pivot end and a second locking end, the second pivot end operably attached for pivotal motion to the latch lever near the latch pivot pin on the handle side of the latch lever from the latch pivot pin, and the second locking end sized and shaped for interfitting engagement with a second catch; and wherein pivoting movement of the latch lever about the latch pivot pin reversibly disengages the second locking end from the second catch.

31. A latch mechanism as set forth in claim 30, wherein the second catch is provided in a catch bar on a side of the retractable-extendable stair assembly.

32. A latch mechanism as set forth in claim 30, wherein the second catch is provided in a left catch bar on the left side of the retractable-extendable stair assembly.

33. A latch mechanism as set forth in claim 30, further comprising:

a biasing member coupled between the latch lever and either the first latch slide bar or the second latch slide bar, wherein the biasing member urges the first latch slide bar toward the first catch.

34. A latch mechanism as set forth in claim 33, wherein the biasing member comprises a spring.

35. A latch mechanism as set forth in claim 30, further comprising:

a biasing member coupled between the latch lever and either the first latch slide bar or the second latch slide bar, wherein the biasing member urges the second latch slide bar toward the second catch.

36. A latch mechanism as set forth in claim 35, wherein the biasing member comprises a spring.

* * * * *